No. 728,954. PATENTED MAY 26, 1903.
O. MILLER.
CLUTCH MECHANISM.
APPLICATION FILED FEB. 24, 1902.
NO MODEL.
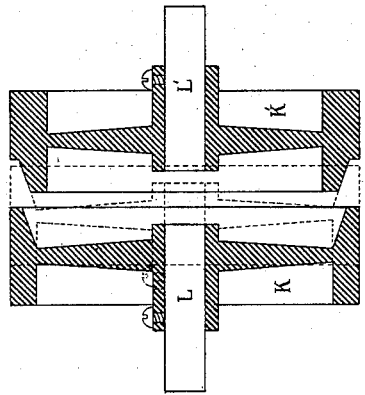
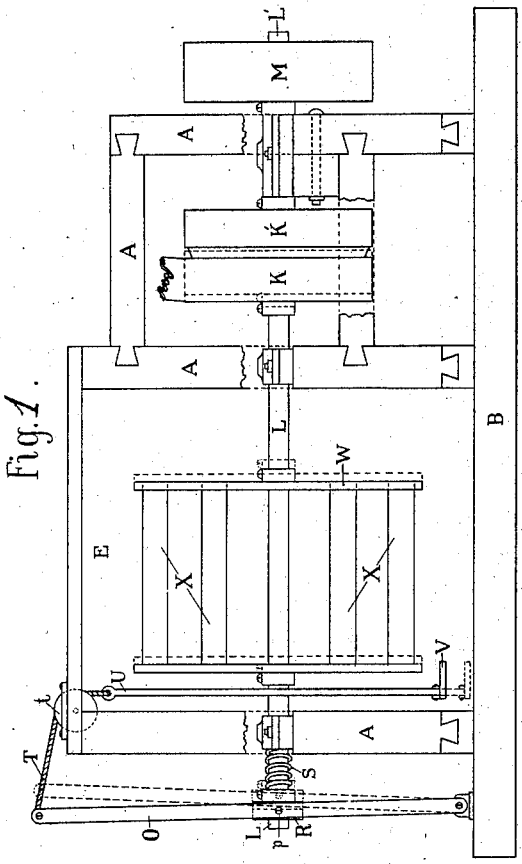
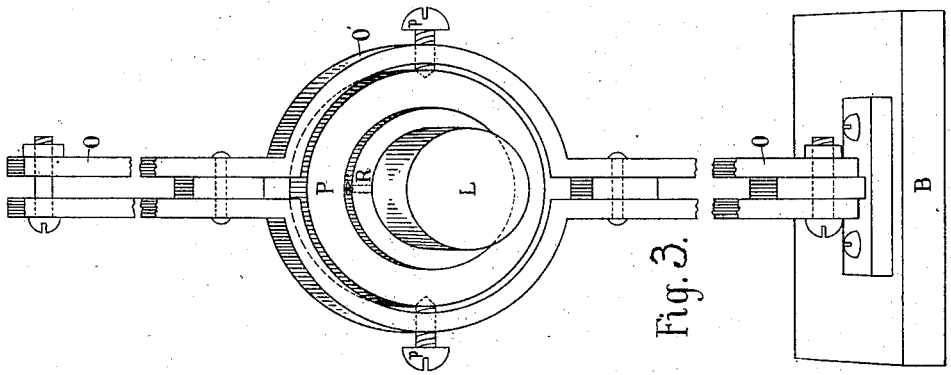
WITNESSES:
Paul A. Viersen
R. L. Henderson
INVENTOR
Oscar Miller
BY
H. C. Gardiner
ATTORNEY No. 728,954. Patented May 26, 1903.

UNITED STATES PATENT OFFICE.

OSCAR MILLER, OF SIOUX CITY, IOWA.

CLUTCH MECHANISM.

SPECIFICATION forming part of Letters Patent No. 728,954, dated May 26, 1903.

Application filed February 24, 1902. Serial No. 95,440. (No model.)

*To all whom it may concern:*

Be it known that I, OSCAR MILLER, a citizen of the United States, residing at Sioux City, in the county of Woodbury and State of Iowa, (whose post-office address is Sioux City, Iowa,) have invented a new and useful Improvement in Clutch Mechanism; and I do declare the following to be a full, clear, and exact description of the same, reference being had to the accompanying drawings, forming a part thereof.

My invention relates to improvements in clutch mechanism; and the object of my invention is to furnish a means of power for the operation of any kind of machinery and place the machine easily under the control of the operator. These objects I attain in the device herein described, in which—

Figure 1 is a detail view of my invention in front elevation. Fig. 2 is an enlarged section of friction-wheels belonging to my invention. Fig. 3 is an enlarged perspective view of lever used in the operation of the machine.

Referring now to the illustrations, in which like parts are designated by similar letters of reference, A A represent the frame or upright part of the machine, and B the platform on which the frame rests.

E is a platform on which materials and tools may be placed.

A combined pulley and friction-wheel K, secured to the right end of the shaft L, extends horizontally across the lower part of the machine and operates in suitable bearings in the framework. A short shaft L', operating in the same axial line, has secured to the left end thereof a friction-wheel K' and at the opposite end a pulley M, to which the power for the operation of the machine is applied. The shaft L' revolves in suitable bearings in the frame A. The shaft L is adapted to slide in its bearings sufficiently to throw the wheel K in or out of contact with its companion wheel K'. At the opposite end of the shaft L is secured a lever O, pivotally secured at the lower end to the platform B. The central part of the lever O' is enlarged and hollow and incloses a bearing P, in which the shaft L is adapted to turn. The hollow portion O' of the lever is pivotally secured to said bearing by means of the screws $p$ $p$, which pass through the surface of the lever and enter the bearing sufficiently to secure the two together and at the same time permit a limited pivotal movement of the lever, as shown by the dotted lines, to prevent binding of the lever upon the bearing. A collar R is secured to the shaft L inside of the bearing P, and a spring S is coiled around the shaft and extends between the collar and the adjacent bearing for the shaft. The spring forces the shaft L toward the left when the machine is not in operation and prevents the contact of the two friction-wheels. A cable or cord T, secured to the upper end of the lever O, passes over a pulley $t$, secured in the platform E, and is attached to a rod U, the lower end of which is attached to a treadle V. When it is desired to impart motion to the machine, the operator presses with the foot upon the treadle, which pulls the lever O to the right, thus forcing the shaft L in the same direction and throwing the friction-wheels into contact, as shown by the dotted lines. The motion of the friction-wheels is imparted to the machinery desired to be operated by means of the belt J.

The shaft L has attached thereto a tread-wheel W, provided with the rounds X X X, by which the machine may be operated if it is desired to dispense with the motive power.

Having described my invention, what I claim as new, and desire to secure by Letters Patent, is—

A pulley to which power for its operation is applied, a shaft to which said pulley is secured, a friction-wheel secured to said shaft and revolving therewith, a wheel adapted to be thrown into contact with said friction-wheel and rotated by means of said contact, a shaft to which said last wheel is secured adapted to slide in its bearings, in combination with a lever pivotally secured at one end to the frame, said lever being hollow near the central part thereof, a bearing inclosed in said hollow part in which the operating-shaft of the machine is adapted to turn, screws pivotally securing said lever to said bearing, a collar secured to said shaft inside of said bearing, a spring secured between said collar and an adjacent bearing for the operating-shaft, and a treadle for the operation of said lever and means for freely connecting said treadle with the opposite end of said lever, substantially as described.

In testimony whereof I affix my signature in the presence of two witnesses.

OSCAR MILLER.

Witnesses:
WM. MILLER,
R. G. HENDERSON.